(12) United States Patent
Moser et al.

(10) Patent No.: US 11,667,325 B2
(45) Date of Patent: Jun. 6, 2023

(54) HYDRAULIC CIRCUIT

(71) Applicant: DANA ITALIA S.R.L., Arco (IT)

(72) Inventors: Davide Moser, Trento (IT); Stefano Fasano, Reggio Emilia (IT); Maurizio Bartoli, Reggio Emilia (IT)

(73) Assignee: DANA ITALIA S.R.L., Arco (IT)

( * ) Notice: Subject to any disclaimer, the term of this patent is extended or adjusted under 35 U.S.C. 154(b) by 406 days.

(21) Appl. No.: 16/760,427

(22) PCT Filed: Oct. 30, 2018

(86) PCT No.: PCT/EP2018/079631
§ 371 (c)(1),
(2) Date: Apr. 29, 2020

(87) PCT Pub. No.: WO2019/086406
PCT Pub. Date: May 9, 2019

(65) Prior Publication Data
US 2020/0339189 A1    Oct. 29, 2020

(30) Foreign Application Priority Data

Oct. 30, 2017 (EP) ..................................... 17425109

(51) Int. Cl.
*B62D 5/08* (2006.01)
*B62D 5/065* (2006.01)
(Continued)

(52) U.S. Cl.
CPC ............... *B62D 5/08* (2013.01); *B62D 5/065* (2013.01); *B62D 5/09* (2013.01); *B62D 5/12* (2013.01)

(58) Field of Classification Search
CPC . B62D 5/08; B62D 5/065; B62D 5/09; B62D 5/12; B62D 7/1509
See application file for complete search history.

(56) References Cited

U.S. PATENT DOCUMENTS

| | | | | |
|---|---|---|---|---|
| 4,431,079 A | * | 2/1984 | Suzuki | ............... B60K 17/3467 |
| | | | | 475/221 |
| 4,830,131 A | * | 5/1989 | Miyoshi | ................... B62D 6/00 |
| | | | | 180/423 |

(Continued)

FOREIGN PATENT DOCUMENTS

| EP | 0093416 A2 | 11/1983 |
|---|---|---|
| EP | 0413425 A1 | 2/1991 |

(Continued)

OTHER PUBLICATIONS

ISA European Patent Office, International Search Report and Written Opinion Issued in Application No. PCT/EP2018/079631, dated Jan. 29, 2019, 9 pages.

*Primary Examiner* — Kevin Hurley
*Assistant Examiner* — Harold Eric Pahlck, III
(74) *Attorney, Agent, or Firm* — McCoy Russell LLP (57) ABSTRACT

A hydraulic circuit, in particular to a hydraulic steering circuit for steering at least one vehicle axle, the hydraulic circuit including a first fluid path having a first end and a second end and providing fluid communication or selective fluid communication between the first end and the second end of the first fluid path; and a second fluid path providing fluid communication or selective fluid communication between the first end of the first fluid path and the second end (2) of the first fluid path, in parallel to the first fluid path or to a section thereof. In some aspects, the first fluid path includes a first hydraulic displacement unit; and the second fluid path includes at least a first proportional bypass control valve for controlling a bypass fluid flow in the second fluid path. The hydraulic steering circuit may be part of a driveline for a vehicle.

17 Claims, 5 Drawing Sheets

(51) Int. Cl.
*B62D 5/09* (2006.01)
*B62D 5/12* (2006.01)

(56) References Cited

U.S. PATENT DOCUMENTS

| | | | | |
|---|---|---|---|---|
| 8,677,799 B2 * | 3/2014 | Jamet | ........................ | F15B 3/00 |
| | | | | 72/453.08 |
| 2003/0000765 A1 * | 1/2003 | Spadafora | ............. | F15B 13/021 |
| | | | | 180/417 |
| 2008/0236156 A1 * | 10/2008 | Kakino | ................... | F15B 15/18 |
| | | | | 60/443 |
| 2008/0236959 A1 * | 10/2008 | Hashida | ................ | B60T 8/4077 |
| | | | | 188/72.2 |
| 2009/0151345 A1 * | 6/2009 | Jeon | ................. | B60W 30/18109 |
| | | | | 60/414 |
| 2013/0181506 A1 * | 7/2013 | Weiberle | ............... | B60T 13/662 |
| | | | | 303/2 |
| 2014/0298798 A1 * | 10/2014 | Belshan | ................... | B62D 5/30 |
| | | | | 60/571 |
| 2015/0292183 A1 * | 10/2015 | Hiraku | ................... | E02F 9/2289 |
| | | | | 60/423 |
| 2016/0209081 A1 * | 7/2016 | Mencel | ..................... | F01N 5/02 |
| 2016/0297656 A1 * | 10/2016 | Ueda | ........................ | B66F 9/22 |

FOREIGN PATENT DOCUMENTS

EP          1112910 A2    7/2001
WO     2015117963 A1    8/2015

* cited by examiner

HYDRAULIC CIRCUIT

CROSS-REFERENCE TO RELATED APPLICATIONS

The present application is a U.S. National Phase of International Patent Application Serial No. PCT/EP2018/079631 entitled "HYDRAULIC CIRCUIT," filed on Oct. 30, 2018. International Patent Application Serial No. PCT/EP2018/079631 claims priority to European Patent Application No. 17425109.0 filed on Oct. 30, 2017. The entire contents of each of the above-referenced applications are hereby incorporated by reference for all purposes.

TECHNICAL FIELD

The invention relates to a hydraulic circuit, in particular to a hydraulic steering circuit for steering at least one vehicle axle, or to a hydraulic circuit for actuating one or more robot arms, for example.

BACKGROUND AND SUMMARY

Known hydraulic steering circuits for steering a steering axle of an automotive vehicle typically comprise at least one fluid pump in fluid communication with at least one hydraulic steering cylinder, wherein the hydraulic steering cylinder is coupled to the steering axle or to a set of wheels mounted on the steering axle. The steering axle may be a vehicle front axle, for example. However, some known drivelines for automotive vehicles comprise two steering axles. A corresponding hydraulic steering circuit then typically comprises two hydraulic steering cylinders, one for steering the front axle of the vehicle, and the other for steering the rear axle of the vehicle. For example, a vehicle with two steering axles may be easier to maneuver as compared to a vehicle having only a single steering axle, in particular at low speeds. However, at high speeds steering both the front axle and the rear axle may lower the stability of the vehicle.

To solve this problem, hydraulic steering circuits for vehicles having two steering axles have been designed which can be switched between a first steering mode in which only one of the two steering axles may be steered, and a second steering mode in which both steering axles may be steered. For example, in many cases an operator of a vehicle comprising two steering axles may choose to operate the hydraulic steering circuit in the first mode when driving the vehicle at high speeds, and to operate the hydraulic steering circuit in the second mode when driving the vehicle at low speeds.

However, the switching of the hydraulic circuit between the above-described first and second steering modes may be detrimental to the maneuverability experienced by the operator. For example, the first steering mode and the second steering mode may each optimize the maneuverability of the vehicle only for a certain speed such as for a low vehicle speed or for a high vehicle speed, but not for an intermediate vehicle speed. Therefore, it may be advantageous to modify the hydraulic circuit in such a way that it may provide additional steering modes. However, the above-described disadvantages are not restricted to hydraulic steering circuits. For example, similar disadvantages may occur in hydraulically driven robots where when or two robot arms are selectively driven by a single hydraulic pump.

Therefore, it is an object of the present invention to design a hydraulic circuit including at least one hydraulic displacement unit such as a hydraulic cylinder or a hydraulic motor, wherein the hydraulic circuit allows using the hydraulic displacement unit in a preferably versatile manner.

This problem is solved by a hydraulic circuit as proposed below, and by a driveline including said hydraulic circuit.

Thus, a hydraulic circuit is presently proposed, in particular a hydraulic steering circuit for steering at least one vehicle axle or for steering a set of wheels mounted on the steering axle. Similarly, the presently proposed hydraulic circuit may be used for actuating one or more hydraulically driven implements such as one or more robot arms, for example. The presently proposed hydraulic circuit comprises at least:

a first fluid path having a first end and a second end and providing fluid communication or selective fluid communication between the first end and the second end of the first fluid path; and a second fluid path providing fluid communication or selective fluid communication between the first end of the first fluid path and the second end of the first fluid path, in parallel to the first fluid path or to a section thereof;

wherein the first fluid path comprises a first hydraulic displacement unit; and wherein the second fluid path comprises at least a first proportional bypass control valve for controlling a bypass fluid flow in the second fluid path.

The first proportional bypass control valve allows controlling an amount of fluid flowing through the first fluid path including the first hydraulic displacement unit, and an amount of fluid bypassing the first fluid path via the second fluid path. Or in other words, at a given rate of fluid flowing through the hydraulic circuit between the first end of the first fluid path and the second end of the first fluid path, a rate of fluid flowing through the first fluid path including the first hydraulic displacement unit may be controlled by controlling a flow-cross section of the first proportional bypass control valve. Within the scope of this document, the term first end of the first fluid path and the term first fluid connection may be used synonymously. That is, the first end of the first fluid path may be but is not limited to a point in the hydraulic circuit where two or more fluid paths or fluid lines connect. Similarly, the term second end of the first fluid path and second fluid connection may be used synonymously. That is, the second end of the first fluid path may be but is not limited to a point in the hydraulic circuit where two or more fluid paths or fluid lines connect.

The first hydraulic displacement unit may comprise a first fluid port in fluid communication or in selective fluid communication with the first end of the first fluid path or with the first fluid connection, and a second fluid port in fluid communication or in selective fluid communication with the second end of the first fluid path or with the second fluid connection. For example, the first hydraulic displacement unit may comprise a first hydraulic cylinder. That is, the first end of the first fluid path or the first fluid connection and the second end of the first fluid path or the second fluid connection are configured to be in fluid communication with one another via the first hydraulic cylinder. In particular, the first hydraulic steering cylinder may comprise a first hydraulic steering cylinder for steering a first vehicle axle or for steering a first set of wheels mounted on the first steering axle. In this case, the first proportional bypass control valve may control a first steering angle of the first steering axle or of the first set of wheels mounted on the first steering axle. For example, the first steering axle may include a vehicle rear axle. Additionally or alternatively, the first hydraulic displacement unit may comprise a first hydraulic motor, wherein the first hydraulic motor may have a variable displacement.

The hydraulic circuit may further comprise a third fluid path having a first end fluidly connected with the second end of the first fluid path and a second end, and providing fluid communication or selective fluid communication between the second end of the first fluid path or the second fluid connection and the second end of the third fluid path. The first end of the third fluid path is fluidly connected with or may coincide with the second end of the first fluid path, for example. In the following, the second end of the third fluid path may also be referred to as third fluid connection. That is, the second end of the third fluid path may be but is not limited to a point in the hydraulic circuit where two or more fluid paths or fluid lines connect. The third fluid path may comprise a second hydraulic displacement unit, so that the first hydraulic displacement unit and the second hydraulic displacement unit may be fluidly connected or selectively fluidly connected in series between the first end of the first fluid path and the second end of the third fluid path.

The second hydraulic displacement unit may comprise a first fluid port in fluid communication or in selective fluid communication with the second end of the first fluid path or with the second fluid connection, and a second fluid port in fluid communication or in selective fluid communication with the second end of the third fluid path or with the third fluid connection. For example, the second hydraulic displacement unit may comprise a second hydraulic cylinder. That is, the second end of the first fluid path or the second fluid connection and the second end of the third fluid path or the third fluid connection are configured to be in fluid communication with one another via the second hydraulic cylinder. In particular, the second hydraulic steering cylinder may comprise a second hydraulic steering cylinder for steering a second vehicle axle or for steering a second set of wheels mounted on the second steering axle. For example, the second steering axle may include a vehicle front axle. In this case, the first proportional bypass control valve may control a ratio between the first steering angle of the first steering axle or of the first set of wheels mounted on the first steering axle, and a second steering angle of the second steering axle or of the second set of wheels mounted on the second steering axle. Additionally or alternatively, the second hydraulic displacement unit may comprise a second hydraulic motor, wherein the second hydraulic motor may have a variable displacement.

The first bypass control valve may be configured as an electronically actuatable valve or may comprise an electronically actuatable valve. For example, the first bypass control valve may comprise a movable valve spool and a solenoid for controlling a position of the valve spool. The hydraulic circuit may further comprise an electronic control unit (ECU). The hydraulic circuit may comprise one or more flow sensors and/or one or more pressure sensors in communication with the ECU, wherein the flow sensors and/or the pressure sensors are configured to determine a fluid flow and/or a hydrostatic pressure in at least one of the first fluid path, the second fluid path, and the third fluid path. The ECU may be configured to control the first bypass control valve, for example based on the fluid flow rate and/or based on the hydrostatic pressure in at least one of the first fluid path, the second fluid path, and the third fluid path. The ECU may be configured to control the first bypass control valve using a feedback control algorithm.

The hydraulic circuit may further comprise a fluid pump and a fluid tank in fluid communication with the fluid pump. The fluid pump may be fluidly connected or selectively fluidly connected with the first end of the first fluid path, and the fluid tank may be fluidly connected or selectively fluidly connected with one of the second end of the first fluid path and the second end of the third fluid path, so that the pump may create a fluid flow through the hydraulic circuit from the first end of the first fluid path fluid connection to one of the second end of the first fluid path and the second end of the third fluid path. Additionally or alternatively, the fluid pump may be fluidly connected or selectively fluidly connected with one of the second end of the first fluid path and the second end of the third fluid path, and the fluid tank may be fluidly connected or selectively fluidly connected with the first end of the first fluid path, so that the pump may create a fluid flow through the hydraulic circuit from one of the second end of the first fluid path and the second end of the third fluid path to the first end of the first fluid path.

For example, the hydraulic circuit may comprise at least one flow direction control valve configured to selectively one of: (i) fluidly connect the fluid pump with the first end of the first fluid path, and fluidly connect the fluid tank with one of the second end of the first fluid path and the second end of the third fluid path; and (ii) fluidly connect the fluid pump with one of the second end of the first fluid path and the second end of the third fluid path, and fluidly connect the fluid tank with the first end of the first fluid path.

The first fluid path may comprise a proportional flow control valve, preferably an electronically actuatable proportional flow control valve for controlling or for additionally controlling a fluid flow in the first fluid path. For example, the proportional flow control valve may comprise a movable valve spool and a solenoid for controlling a position of the valve spool. The ECU may be configured to control the proportional flow control valve, for example based on a fluid flow and/or on a hydrostatic pressure in at least one of the first fluid path, the second fluid path, and the third fluid path. The proportional flow control valve may comprise a first fluid port in fluid communication or in selective fluid communication with the first hydraulic displacement unit, and a second fluid port in fluid communication or in selective fluid communication with the second end of the first fluid path and/or with the second end of the third fluid path.

The first proportional bypass control valve may comprise:
    a first hydrostatically actuatable actuator configured to bias the first proportional bypass control valve toward a closed position, and
    a second hydrostatically actuatable actuator configured to bias the first proportional bypass control valve toward an open position;
    wherein the first hydrostatically actuatable actuator of the first proportional bypass control valve is in fluid communication or in selective fluid communication with the first fluid port of the proportional flow control valve; and,
    wherein the second hydrostatically actuatable actuator of the first proportional bypass control valve is in fluid communication or in selective fluid communication with the second fluid port of the proportional flow control valve.

Additionally, the first proportional bypass control valve may include a biasing member such as spring biasing the first proportional bypass control valve toward the closed position. The first hydrostatically actuatable actuator of the first proportional bypass control valve may be in fluid communication or in selective fluid communication with the first fluid port of the proportional flow control valve via a flow restrictor such as an orifice.

A pressure drop over the proportional flow control valve creates a pressure gradient between the hydrostatic pressures acting on the first and the second pressure actuatable actuators of the first proportional bypass control valve. Thus, the proportional flow control valve in connection with the first proportional bypass control valve comprising the above-described first and second hydrostatically actuatable actuators may keep a ratio between the fluid flow in the first and in the second fluid path constant even as a mechanical load coupled to the first hydraulic displacement unit varies. For example, when fluid flows through the hydraulic circuit from the second end of the first fluid path to the first end of the first fluid path and the mechanical load coupled to the first hydraulic displacement unit increases, a hydrostatic pressure acting on the first hydrostatically actuatable actuator of the first proportional bypass control valve increases, thereby further closing the first proportional bypass control valve to keep the ratio between the fluid flow in the first and in the second fluid path constant.

The hydraulic circuit may further comprise a fourth fluid path providing fluid communication or selective fluid communication between the first and the second end of the first fluid path, in parallel to the first fluid path or to a section thereof, or in parallel to the first proportional bypass control valve. The fourth fluid path may comprise a second proportional bypass control valve for controlling a bypass fluid flow in the second fluid path and/or in the fourth fluid path. The second proportional bypass control valve may comprise a first fluid port in fluid communication or in selective fluid communication with the first end of the first fluid path, and a second fluid port in fluid communication or in selective fluid communication with one of the second end of the first fluid path and the second end of the third fluid path.

In one embodiment, the second proportional bypass control valve may comprise:
- a first hydrostatically actuatable actuator configured to bias the second proportional bypass control valve toward a closed position, and
- a second hydrostatically actuatable actuator configured to bias the second proportional bypass control valve toward an open position;
- wherein the first hydrostatically actuatable actuator of the second proportional bypass control valve is in fluid communication or in selective fluid communication with the second fluid port of the proportional flow control valve; and,
- wherein the second hydrostatically actuatable actuator of the second proportional bypass control valve is in fluid communication or in selective fluid communication with the first fluid port of the proportional flow control valve.

Additionally, the second proportional bypass control valve may include a biasing member such as a spring biasing the second proportional bypass control valve toward the closed position. The first hydrostatically actuatable actuator of the second proportional bypass control valve may be in fluid communication or in selective fluid communication with the second fluid port of the proportional flow control valve via a flow restrictor such as an orifice.

A pressure drop over the proportional flow control valve then creates a pressure gradient between the hydrostatic pressures acting on the first and on the second pressure actuatable actuator of the second proportional bypass control valve. Thus, the proportional flow control valve in connection with the second proportional bypass control valve comprising the above-described first and second hydrostatically actuatable actuators may keep a ratio between the fluid flow in the first and in the fourth fluid path constant even as a mechanical load coupled to the first hydraulic displacement unit varies. For example, when fluid flows through the hydraulic circuit from the first end of the first fluid path to the second end of the first fluid path and the mechanical load coupled to the first hydraulic displacement unit increases, a hydrostatic pressure acting on the second hydrostatically actuatable actuator of the second proportional bypass control valve decreases, thereby further closing the second proportional bypass control valve to keep the ratio between the fluid flow in the first and in the fourth fluid path constant.

The first proportional bypass control valve may be configured to allow a flow of fluid through the second fluid path only from the second end of the first fluid path toward the first end of the first fluid path, and to block a flow of fluid through the second fluid path from the first end of the first fluid path toward the second end of the first fluid path. And similarly, the second proportional bypass control valve may be configured to allow a flow of fluid through the fourth fluid path only from the first end of the first fluid path toward the second end of the first fluid path, and to block a flow of fluid through the fourth fluid path from the second end of the first fluid path toward the first end of the first fluid path.

In a further embodiment, the first proportional bypass control valve may be configured as a two-way valve allowing a flow of fluid through the second fluid path in both flow directions between the first and the second end of the first fluid path. And, similarly, the second proportional bypass control valve may be configured as a two-way valve allowing a flow of fluid through the fourth fluid path in both flow directions between the first and the second end of the first fluid path.

The second proportional bypass control valve may be configured as an electronically actuatable valve. For example, the second bypass control valve may comprise a movable valve spool and a solenoid for controlling a position of the valve spool. The ECU may be configured to control the second bypass control valve, for example based on the fluid flow rate and/or based on the hydrostatic pressure in at least one of the first fluid path, the second fluid path, and the third fluid path. The ECU may be configured to control the second bypass control valve using a feedback control algorithm.

The hydraulic circuit may then further comprise a first shuttle valve configured to select as a hydrostatic pressure acting on the second hydrostatically actuatable actuator of the first proportional bypass control valve a maximum hydrostatic pressure acting on the second proportional bypass control valve, for example a maximum of a hydrostatic pressure acting on the first and the second fluid port of the second proportional bypass control valve.

And the hydraulic circuit may further comprise a second shuttle valve configured to select as a hydrostatic pressure acting on the first hydrostatically actuatable actuator of the first proportional bypass control valve a maximum hydrostatic pressure acting on the first hydraulic displacement unit, for example a maximum of a hydrostatic pressure acting on the first and the second fluid port of the first hydraulic displacement unit.

The hydraulic circuit may further comprise:
- a first flow restrictor; and
- a second flow restrictor;
- wherein the first fluid port of the second proportional bypass control valve and a first fluid port of the first shuttle valve are in fluid communication or in selective fluid communication with a first end of the first fluid path via the first flow restrictor; and wherein the second fluid port of the second proportional bypass control valve and a second fluid port of the first shuttle valve are in fluid communication with the second end of the first fluid path via the second flow restrictor.

In this way, the second proportional bypass control valve may be used to control the hydrostatic pressure acting on the second hydrostatically actuatable actuator of the first proportional bypass control valve. For example, when fluid flows through the hydraulic circuit between the first and the second end of the first fluid path, opening or partially opening the second proportional bypass control valve may create a pressure drop over at least one of the first flow restrictor and the second flow restrictor, thereby decreasing the hydrostatic pressure acting on the second hydrostatically actuatable actuator of the second proportional bypass control valve and closing or partially closing the first proportional bypass control valve.

The fourth fluid path may further comprise:
a first one-way valve, and
a second one-way valve;
wherein the first one-way valve is configured to allow a flow of fluid from the first fluid port of the second proportional bypass control valve toward the first end of the first fluid path to bypass the first flow restrictor; and
wherein the second one-way valve is configured to allow a flow of fluid from the second fluid port of the second proportional bypass control valve toward the second end of the first fluid path to bypass the second flow restrictor.

As fluid flows through the fourth fluid path between the first and the second end of the first fluid path, the above-described connection of the first one-way valve and the second one-way valve leads to a pressure drop over only one of the first flow restrictor and the second flow restrictor at a given time.

Furthermore, a driveline for a vehicle is presently proposed. The proposed driveline comprises at least:
a first steering axle, in particular a vehicle rear axle;
a second steering axle, in particular a vehicle front axle; and
the previously described hydraulic circuit, comprising at least:
the first fluid path providing fluid communication or selective fluid communication between the first and the second end of the first fluid path, the first fluid path comprising at least the first hydraulic steering cylinder for steering the first vehicle axle, in particular for steering a first set of wheels mounted on the first vehicle axle;
the second fluid path providing fluid communication or selective fluid communication between the first and the second end of the first fluid path, in parallel to the first fluid path or to a section thereof, the second fluid path comprising at least the first proportional bypass control valve; and
the third fluid path providing fluid communication or selective fluid communication between the second end of the first fluid path and the second end of the third fluid path, the third fluid path comprising at least the second hydraulic steering cylinder for steering the second vehicle axle, in particular for steering a second set of wheels mounted on the second vehicle axle.

Additionally, the hydraulic circuit of the driveline may include all features or feature combinations described above.

BRIEF DESCRIPTION OF THE FIGURES

Embodiments of the invention are depicted in the Figures and further described in the following detailed description in which.

DETAILED DESCRIPTION

Figure 1:
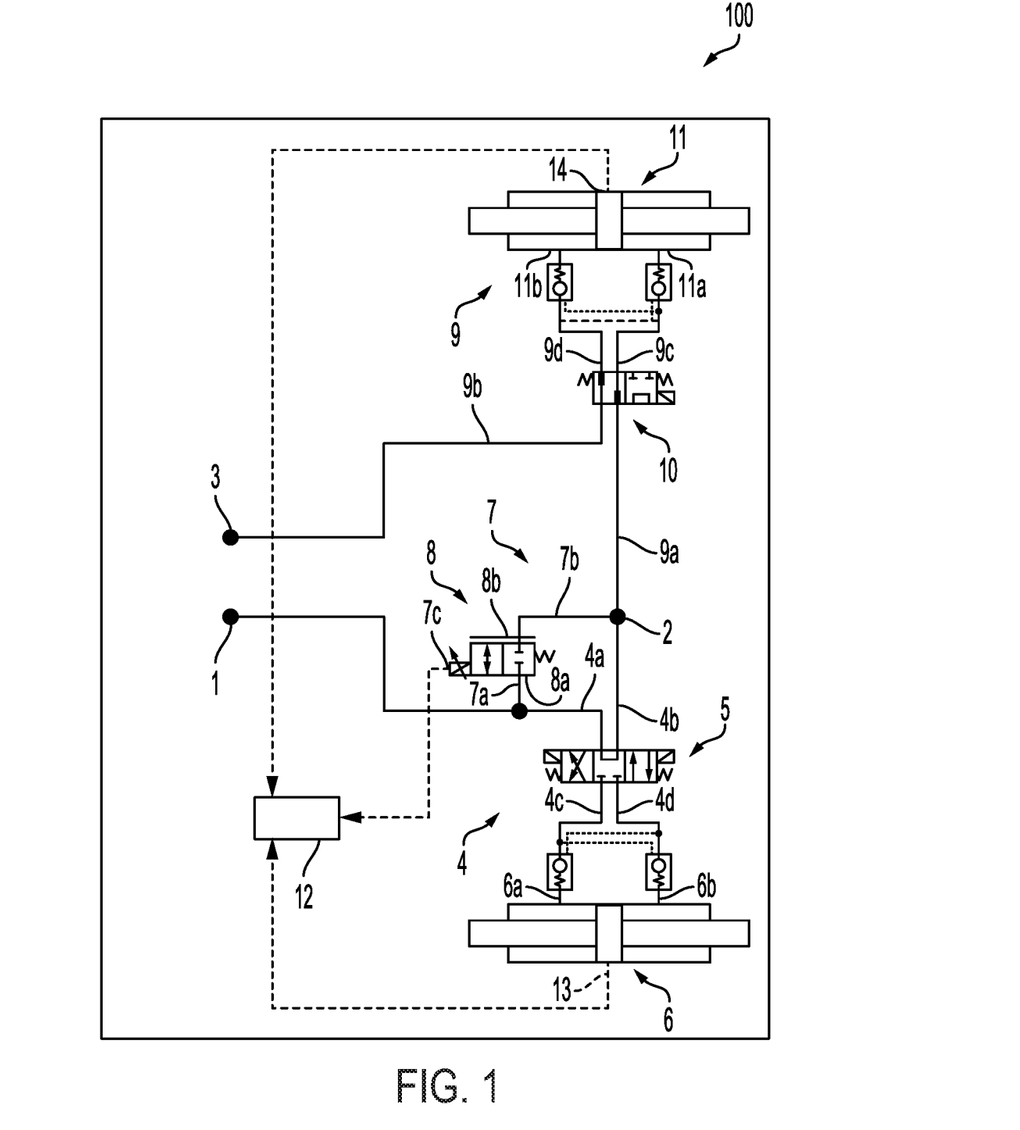
FIG. 1 shows a hydraulic steering circuit for a vehicle according to a first embodiment.

FIG. 1 shows a hydraulic circuit 100, such as a steering circuit for a vehicle, according to a first embodiment. It is understood that the hydraulic circuit 100 may likewise be used for actuating other hydraulically actuated implements such as one or more hydraulically driven arms of a robot, for example. The hydraulic circuit 100 comprises a first fluid path 4 having a first end or first fluid connection 1 and a second end or second fluid connection 2, and comprising fluid lines 4a, 4b, 4c and 4d, an electronically actuatable 4/3-way valve 5, and a first hydraulic displacement unit 6 provides selective fluid communication between the first fluid connection 1 and the second fluid connection 2. The first hydraulic displacement unit 6 is configured as a hydraulic cylinder for actuating a first set of wheels mounted on a rear axle of the vehicle (not shown). The vehicle may be an off-highway vehicle such as a wheel loader, a backhoe loader, a dumper truck, a tractor, a mining vehicle, or the like. In an alternative embodiment, the first hydraulic displacement unit 6 may include a hydraulic cylinder or a hydraulic motor for actuating a robot arm, for example. The first hydraulic displacement unit 6 has a first fluid port 6a and a second fluid port 6b. The 4/3-way valve 5 is configured to selectively one of: directly fluidly connect the first fluid connection 1 with the second fluid connection 2, thereby fluidly isolating the first hydraulic displacement unit 6 from the first fluid connection 1 and the second fluid connection 2; fluidly connect the first fluid port 6a with the first fluid connection 1, while fluidly connecting the second fluid port 6b with the second fluid connection 2; and fluidly connect the first fluid port 6a with the second fluid connection 2, while fluidly connecting the second fluid port 6b with the first fluid connection 1.

A second fluid path 7 comprising fluid lines 7a-b and a first embodiment of a first proportional bypass control valve 8 provides selective fluid communication between the first fluid connection 1 and the second fluid connection 2, in parallel to the first fluid path 4 or to a section thereof, wherein here and in the following all pressure drops along fluid lines are neglected for simplicity. The first proportional bypass control valve 8 has a first fluid port 8a fluidly connected with the first fluid connection 1, and a second fluid port 8b fluidly connected with the second fluid connection 2. The first proportional bypass control valve 8 has a continuously variable flow cross-section and may be fully closed. In the hydraulic circuit 100 of FIG. 1, the first proportional bypass control valve 8 is an electronically actuatable valve having a solenoid 7c for moving a valve spool.

A third fluid path 9 has a first end coinciding with the second fluid connection 2 and a second end, also termed third fluid connection 3. The third fluid path 9 comprises fluid lines 9a, 9b, 9c, and 9d, an electronically actuatable 2/2-way valve 10, and a second hydraulic displacement unit 11 providing fluid communication between the second fluid connection 2 and the third fluid connection 3. The second hydraulic displacement unit 11 is configured as a hydraulic cylinder for actuating a second set of wheels mounted on a front axle of the vehicle (not shown). In the above-described alternative embodiment, the second hydraulic displacement unit 11 may include a hydraulic cylinder or a hydraulic motor for actuating a further robot arm, for example. The second hydraulic displacement unit 11 has a first fluid port 11a and a second fluid port 11b. The 2/2-way valve 10 is configured to selectively one of: directly fluidly connect the second fluid connection 2 with the third fluid connection 3, thereby fluidly isolating the second hydraulic displacement unit 11 from the second fluid connection 2 and from the third fluid connection 1; and fluidly connect the first fluid port 11a with the second fluid connection 2, while fluidly connecting the second fluid port 11b with the third fluid connection 3.

In the hydraulic circuit 100 of FIG. 1 the first proportional bypass control valve 8 is an electronically actuatable valve having a solenoid configured to move a valve spool. An electronic control unit (ECU) 12 is configured to control the first proportional bypass control valve 8 via electromagnetic control signals. Furthermore, the ECU 12 is configured to control the valves 5 and 10. For example the ECU 12 may be configured to control the first proportional bypass control valve 8 based on signals from a first position sensor 13 measuring a position of an actuator of the first hydraulic displacement unit 6, and/or based on signals from a second position sensor 14 configured to measure a position of an actuator of the second hydraulic displacement unit 11.

Figure 2:
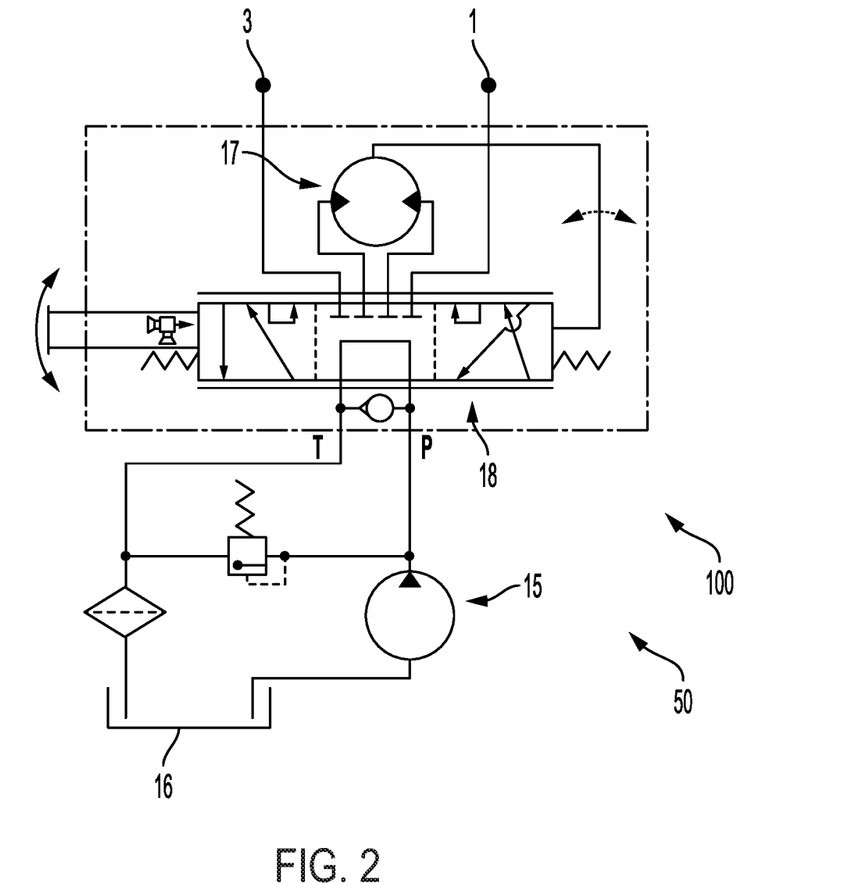
FIG. 2 shows a power steering unit which may be part of the hydraulic steering circuit of FIG. 1.

FIG. 2 shows a power steering unit 50 which forms a part of the hydraulic circuit 100 of FIG. 1, wherein here and in the following recurring features are designated with the same reference signs. The first fluid connection 1 and the third fluid connection 3 form an interface between the parts of the hydraulic circuit 100 depicted in FIGS. 1 and 2. The power steering circuit 50 comprises a first fluid pump 15, a fluid tank 16 in fluid communication with the first fluid pump 15, a second fluid pump 17, and a flow direction control valve 18. The second fluid pump 17 may be a gerotor pump, for example. The second fluid pump 17 is coupled to a steering wheel of the vehicle and is configured to start turning when or once the steering wheel is actuated.

The flow direction control valve 18 is configured to selectively one of:
  fluidly isolate the first fluid connection 1 and the third fluid connection 3 from the fluid pumps 15, 17 and from the fluid tank;
  fluidly connect the first fluid connection 1 with the first fluid pump 15 and with a high pressure side of the second fluid pump 17, while fluidly connecting the third fluid connection 3 with the fluid tank 16, thereby creating a high pressure at the first fluid connection 1 and a low pressure at the third fluid connection 3, for example for steering the vehicle to the right; and
  fluidly connect the third fluid connection 3 with the first fluid pump 15 and with a high pressure side of the second fluid pump 17, while fluidly connecting the first fluid connection 1 with the fluid tank 16, thereby creating a high pressure at the third fluid connection 3 and a low pressure at the first fluid connection 1, for example for steering the vehicle to the left.

When the first fluid connection 1 is fluidly connected with the high pressure side of the second fluid pump 17 and the third fluid connection 3 is fluidly connected with the fluid tank 16, the fluid pumps 15, 17 may create a fluid flow through the hydraulic circuit 100 from the first fluid connection 1 toward the third fluid connection 3 (right steering). Similarly, when the third fluid connection 3 is fluidly connected with the high pressure side of the second fluid pump 17 and the first fluid connection 1 is fluidly connected with the fluid tank 16, the fluid pumps 15, 17 may create a fluid flow through the hydraulic circuit 100 from the third fluid connection 3 toward the first fluid connection 1 (left steering).

For each flow direction the ECU 12 may control the valves 5 and 10 such that the fluid flow between the first fluid connection 1 and the third fluid connection 3 actuates one of:
  only the first hydraulic displacement unit 6 (that is only the rear steering cylinder);
  only the second hydraulic displacement unit 11 (also referred to as the front steering cylinder); and
  both the first hydraulic displacement unit 6 and the second hydraulic displacement unit 11 (that is both the front steering cylinder and the rear steering cylinder), wherein the first hydraulic displacement unit 6 and the second hydraulic displacement unit 11 are fluidly connected in series between the first fluid connection and the third fluid connection 3.

Furthermore, when both the front steering cylinder 11 and the rear steering cylinder 6 are actuated, the ECU may control the valve 5 to select one of:
  a concordant steering mode in which the front wheels and the rear wheels are steered in the same direction, for example by fluidly connecting the first fluid connection 1 with the second fluid port 6b of the rear steering cylinder 6, and by fluidly connecting the first fluid port 11a of the front steering cylinder 11 with the first fluid port 6a of the rear steering cylinder 6; and
  a discordant steering mode in which the front wheels and the rear wheels are steered in opposite directions, for example by fluidly connecting the first fluid connection 1 with the first fluid port 6a of the rear steering cylinder 6, and by fluidly connecting the first fluid port 11a of the front steering cylinder 11 with the second fluid port 6b of the rear steering cylinder 6.

For example, the concordant steering mode may improve the maneuverability of the vehicle at high vehicle speeds, whereas the discordant steering mode may improve the maneuverability at low vehicle speeds.

Importantly, when both the first fluid path 4 including the rear steering cylinder 6 and the third fluid path 9 including the front steering cylinder 11 are fluidly connected in series between the first fluid connection 1 and the third fluid connection 3, the ECU 12 may control a ratio between the steering angle of the front wheels and the steering angle of the rear wheels. To that end, the ECU 12 may control the flow cross-section of the first proportional bypass control valve 8, thereby controlling what percentage of the total fluid flow between the first fluid connection 1 and the third fluid connection 3 is led through the first fluid path 4 including the rear steering cylinder 6, and what percentage of the total fluid flow between the first fluid connection 1 and the third fluid connection 3 is led through the second fluid path 7 including the first proportional bypass control valve 8.

For example, the ECU 12 may decrease the steering angle of the rear wheels with respect to the steering angle of the front wheels by increasing the flow cross-section of the first proportional bypass control valve 8, thereby increasing the fluid flow in the second fluid path 7 and decreasing the displacement of the rear steering cylinder 6 with respect to the displacement of the front steering cylinder 11. Similarly, the ECU 12 may increase the steering angle of the rear wheels with respect to the steering angle of the front wheels by decreasing the flow cross-section of the first proportional bypass control valve 8, thereby decreasing the fluid flow in the second fluid path 7 and increasing the displacement of the rear steering cylinder 6 with respect to the displacement of the front steering cylinder 11.

In the hydraulic circuit 100 of FIG. 1 the ratio between the displacement of the front steering cylinder 11 and the displacement of the rear steering cylinder 6, which corresponds to the ratio between the steering angle of the front wheels and the steering angle of the rear wheels, may further depend on a mechanical load coupled to the front steering cylinder 11 and to the rear steering cylinder 6, such as on an amount of friction between the front wheels and the ground on one hand and on an amount of friction between the rear wheel and the ground on the other. However, the amount of friction between the front wheels and the ground and between the rear wheels and the ground may change due to inhomogeneous ground conditions. For example, the front wheels may be placed on asphalt while the rear wheels are placed on mud.

To compensate for varying mechanical loads coupled to the front steering cylinder 11 and to the rear steering cylinder 6, the ECU 12 may be configured to control the flow cross-section of the first proportional bypass control valve 8 in such a way that the percentage of fluid flow in the second fluid path 7 with respect to the total fluid flow between the first fluid connection 1 and the third fluid connection 3 is kept constant during a given steering maneuver. For example, the ECU 12 may be configured to control the flow cross-section of the first bypass control valve 8 based on signals from the position sensors 13, 14 and/or based on a measured fluid flow in at least one of the first fluid path 4, the second fluid path 7, and the third fluid path 9. For instance, the ECU 12 may be configured to decrease the flow cross-section of the first proportional bypass control valve 8 when or once it detects a relative increase in the fluid flow in the second fluid path 7 with respect to a total fluid flow between the first fluid connection 2 and the third fluid connection 3 during a steering maneuver. Similarly, the ECU 12 may be configured to increase the flow cross-section of the first proportional bypass control valve 8 when or once it detects a relative decrease in the fluid flow in the second fluid path 7 with respect to a total fluid flow between the first fluid connection 2 and the third fluid connection 3 during a steering maneuver. The ECU 12 may be configured to control the first proportional bypass control valve 8 using feedback control. The ECU 12 may be configured to select a desired ratio between the displacement of the front steering cylinder 11 and the displacement of the rear steering cylinder 6 based on a vehicle speed.

Figure 3:
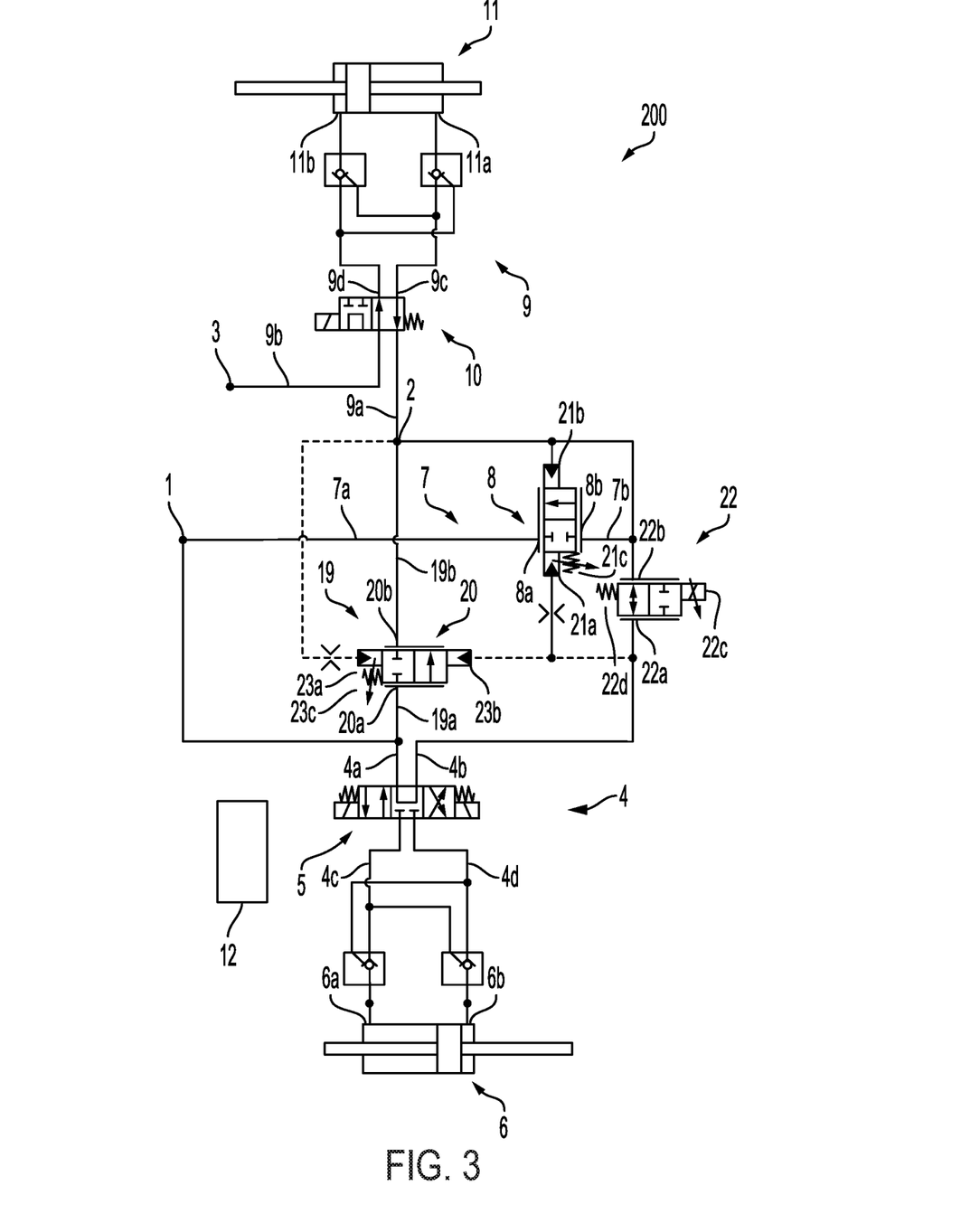
FIG. 3 shows a hydraulic steering circuit for a vehicle according to a second embodiment.

FIG. 3 shows a hydraulic steering circuit 200 for a vehicle according to a second embodiment. Like the hydraulic circuit 100 of FIG. 1 the hydraulic steering circuit 200 of FIG. 3 comprises: the first fluid connection 1; the second fluid connection 2; the third fluid connection 3; the first fluid path 4 providing fluid communication between the first fluid connection 1 and the second fluid connection 2, and including the fluid lines 4a, 4b, 4c, and 4d, the electronically actuatable valve 5, and the first hydraulic displacement unit 6, wherein the first hydraulic displacement unit 6 is configured as a rear steering cylinder; the second fluid path 7 providing selective fluid communication between the first fluid connection 1 and the second fluid connection 2, in parallel to the first fluid path 4 or to a section thereof, and including the fluid lines 7a and 7b, and a second embodiment of the first proportional bypass control valve 8; and the third fluid path 9 providing fluid communication between the second fluid connection 2 and the third fluid connection 3 and including the fluid lines 9a, 9b, 9c, and 9d, the electronically actuatable 2/2-way valve 10 and the second hydraulic displacement unit 11, wherein the second hydraulic displacement unit 11 is configured as a front steering cylinder. Additionally, the hydraulic steering circuit 200 includes the hydraulic power steering unit 50 of FIG. 2.

In the steering circuit 200 of FIG. 3 the first fluid path 4 further comprises a valve 22 having a first fluid port 22a and a second fluid port 22b. The valve 5 is configured to selectively fluidly connect the first fluid port 22a with one of the rear steering cylinder 6 and the first fluid connection 1, and the second fluid port 22b is fluidly connected with the second fluid connection 2. The valve 22 is an electronically actuatable valve having a solenoid 22c for moving a valve spool. A spring 22d biases the valve 22 toward the open position. The valve 22 has a continuously variable flow cross-section and may be fully closed. The ECU 12 is configured to control the valve 22 via electromagnetic control signals. The valve 22 is configured to control a fluid flow in the first fluid path 4, and in particular a percentage of the total fluid flow between the first fluid connection 1 and the second fluid connection 2 and/or the third fluid connection 3 flowing through the first fluid path 4.

In the steering circuit 200 of FIG. 3 the first proportional bypass control valve 8 is configured as a hydrostatically actuatable valve comprising a first hydrostatically actuatable actuator 21a configured to bias the valve 8 toward a closed position, and a second hydrostatically actuatable actuator 21b configured to bias the valve 8 toward an open position. A spring 21c additionally biases the valve 8 toward the closed position. The first actuator 21a is fluidly connected with the first fluid port 22a of the valve 22, and the second actuator 21b is fluidly connected with the second fluid port 22b of the valve 22. The valve 8 according to FIG. 3 is configured as a one-way valve. That is, when the valve 8 according to FIG. 3 is open or partially open, fluid may flow through the second fluid path 7 only from the second fluid connection 2 toward the first fluid connection 1, but not from the first fluid connection 1 toward the second fluid connection 2. As in FIG. 1, the valve 8 of FIG. 3 has a continuously variable flow cross-section and may be fully closed.

The steering circuit 200 of FIG. 3 further comprises a fourth fluid path 19 providing selective fluid communication between the first fluid connection 1 and the second fluid connection 2, in parallel to the first fluid path 4 or to a section thereof, and in parallel to the second fluid path 7 or to a section thereof. The fourth fluid path 19 includes fluid lines 19a and b, and a first embodiment of a second proportional bypass control valve 20 for controlling a bypass fluid flow in the fourth fluid path 19. The valve 20 has a first fluid port 20a fluidly connected with the first fluid connection 1, and a second fluid port 20b fluidly connected with the second fluid connection 2.

In the steering circuit 200 of FIG. 3 the valve 20 is configured as a hydrostatically actuatable valve comprising a first hydrostatically actuatable actuator 23a configured to bias the valve 20 toward a closed position, and a second hydrostatically actuatable actuator 23b configured to bias the valve 20 toward an open position. A spring 23c additionally biases the valve 20 toward the closed position. The first actuator 23a is fluidly connected with the second fluid port 22b of the valve 22, and the second actuator 23b is fluidly connected with the first fluid port 22a of the valve 22. The valve 20 according to FIG. 3 is configured as a one-way valve. That is, when the valve 20 according to FIG. 3 is open or partially open, fluid may flow through the fourth fluid path 19 only from the first fluid connection 1 toward the second fluid connection 2, but not from the second fluid connection 2 toward the first fluid connection 1. The valve 20 of FIG. 3 has a continuously variable flow cross-section and may be fully closed.

As the rear steering cylinder 6 and the front steering cylinder 11 are fluidly connected in series between the first fluid connection 1 and the third fluid connection 3 and fluid flows through the hydraulic circuit 200 from the first fluid connection 1 toward the third fluid connection 3 (right steering), the valve 8 closes, and the valve 22 and the valve 20 control the flow of fluid in the first fluid line 4 including the rear steering cylinder 6, and in the fourth fluid line 19. With a given flow cross-section of the valve 22 set by the ECU 12, the valve 20 ensures a constant pressure drop between the fluid ports 22a, 22b of the valve 22 and a constant fluid flow through the rear steering cylinder 6, irrespective of a mechanical load coupled to the rear steering cylinder 6.

Similarly, as the rear steering cylinder 6 and the front steering cylinder 11 are fluidly connected in series between the first fluid connection 1 and the third fluid connection 3 and fluid flows through the hydraulic circuit 200 from the third fluid connection 3 toward the first fluid connection 1 (left steering), the valve 20 closes, and the valve 22 and the valve 8 control the flow of fluid in the first fluid line 4 including the rear steering cylinder 6, and in the second fluid path 7. With a given flow cross-section of the valve 22 set by the ECU 12, the valve 8 ensures a constant pressure drop between the fluid ports 22a, 22b of the valve 22 and a constant fluid flow through the rear steering cylinder 6, irrespective of a mechanical load coupled to the rear steering cylinder 6.

Thus, the valves 22, 8 and 20 in FIG. 3 function as a two-direction compensator valve with priority function providing a constant fluid flow through the rear steering cylinder 6, irrespective of a mechanical load coupled to the rear cylinder 6 (imposed, for example, by varying ground conditions). In the hydraulic circuit 200 of FIG. 3, the ECU 12 may be configured to set the flow cross-section of the valve 22 based on a fluid flow in the third fluid path 9 or a displacement rate (measured in volume per second) of the front steering cylinder 11.

Figure 4:
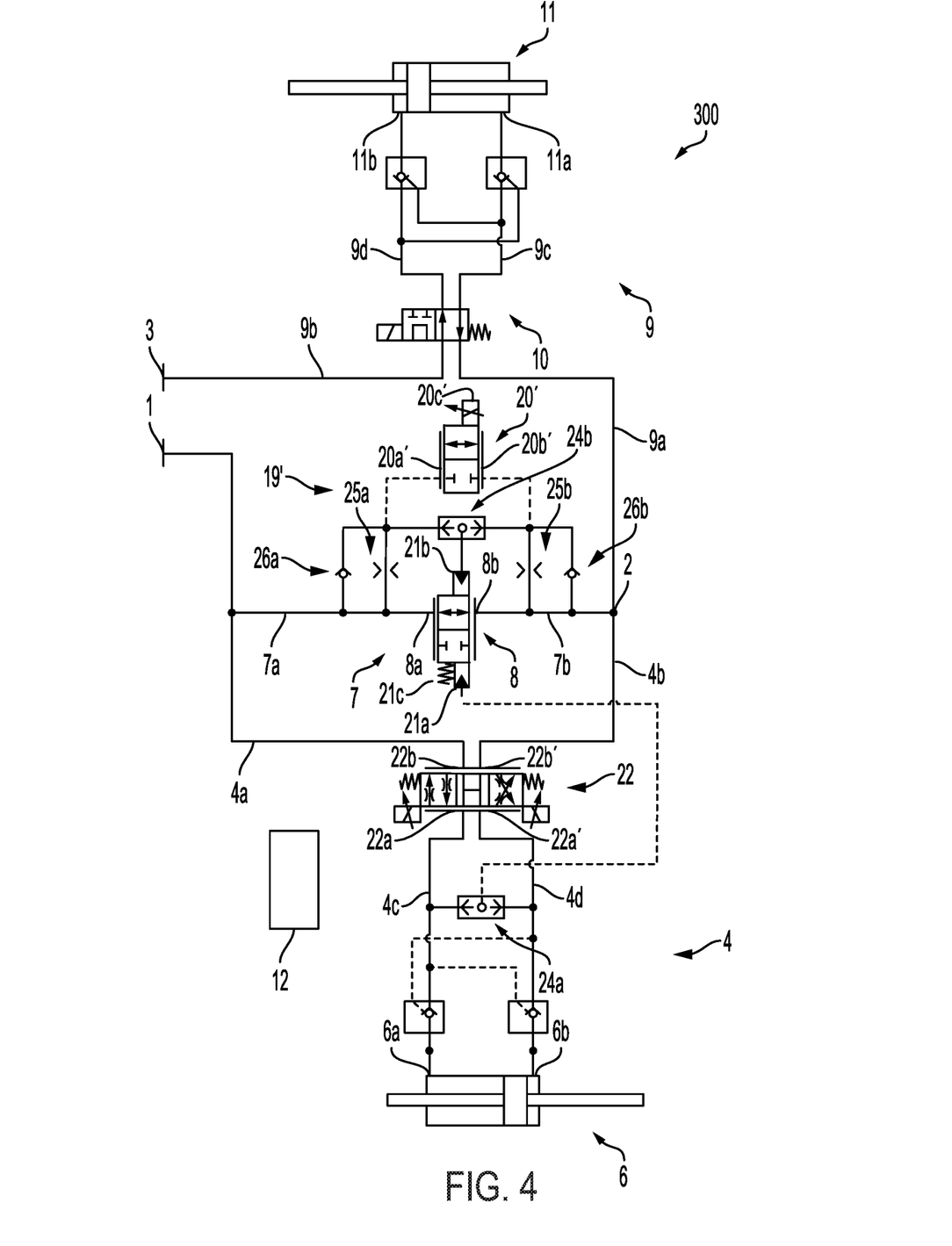
FIG. 4 shows a hydraulic steering circuit for a vehicle according to a third embodiment.

FIG. 4 shows a hydraulic steering circuit 300 for a vehicle according to a third embodiment. Again, the hydraulic steering circuit 300 of FIG. 4 includes the steering power unit 50 shown in FIG. 2. The hydraulic steering circuit 300 of FIG. 4 differs from the hydraulic steering circuit 200 of FIG. 3 in that the electronically actuatable proportional flow control valve 22 according to FIG. 4 disposed in the first fluid path 4 is configured as a 4/3-way valve having fluid ports 22a, 22a' fluidly connected with the rear steering cylinder 6, and fluid ports 22b, 22b' fluidly connected with the first fluid connection 1 and with the second fluid connection 2, respectively. In other words, the valve 22 controls both a fluid flow through the rear steering cylinder 6 and a steering direction or steering mode of the rear steering cylinder 6.

The hydraulic steering circuit 300 of FIG. 4 further differs from the hydraulic steering circuit 200 of FIG. 3 in that the first proportional bypass control valve 8 according to FIG. 4 is configured as a two-way valve allowing a flow of fluid through the second fluid path 7 in both flow directions between the first fluid connection 1 and the second fluid connection 2.

The hydraulic steering circuit 300 of FIG. 4 further differs from the hydraulic steering circuit 200 of FIG. 3 in that in the steering circuit 300 of FIG. 4 the first hydrostatically actuatable actuator 21a of the first proportional bypass control valve 8 is selectively fluidly connected with the fluid ports 22a, 22a' of the valve 22 and with the fluid ports 6a, 6b of the rear steering cylinder 6 via a shuttle valve 24a. The shuttle valve 24a is configured to select as a hydrostatic pressure acting on the first actuator 21a of the valve 8 a maximum hydrostatic pressure out of the hydrostatic pressures acting on the fluid ports 6a, 6b of the rear steering cylinder 6.

The hydraulic steering circuit 300 of FIG. 4 further differs from the hydraulic steering circuit 200 of FIG. 3 in that in the steering circuit 300 of FIG. 4 the fourth fluid path 19' providing selective fluid communication between the first fluid connection 1 and the second fluid connection 2, in parallel to the first fluid path 4 or to a section thereof and in parallel to the second fluid path 7 or to a section thereof, comprises an electronically actuatable second proportional bypass control valve 20' having a solenoid 20c' for moving a valve spool. For example, the ECU 12 may be configured to control the valve 20' through electromagnetic control signals. The valve 20' has a continuously variable flow cross-section and may be fully closed. The valve 20' is configured as a two-way valve allowing a flow of fluid through the fourth fluid path 19' in both flow directions between the first fluid connection 1 and the second fluid connection 2. A first fluid port 20a' of the valve 20' is fluidly connected with the first fluid connection 1 via a first flow restrictor 25a, and a second fluid port 20b' of the valve 20' is fluidly connected with the second fluid connection 2 via a second flow restrictor 25b. The first flow restrictor 25a and the second flow restrictor 25b may comprise a first orifice and a second orifice, for example.

Additionally, the first fluid port 20a' of the valve 20' is fluidly connected with the first fluid connection 1 via a first one-way valve 26a. The first one-way valve 26a allows a fluid flow through the fourth fluid path 19' from the second fluid connection 2 toward the first fluid connection 1 to bypass the first flow restrictor 25a. And the first one-way valve 26a forces a fluid flow through the fourth fluid path 19' from the first fluid connection 1 toward the second fluid connection 2 to pass through the first flow restrictor 25a, thereby creating a pressure drop across the first flow restrictor 25a.

And the second fluid port 20b' of the valve 20' is fluidly connected with the second fluid connection 2 via a second one-way valve 26b. The second one-way valve 26b allows a fluid flow through the fourth fluid path 19' from the first fluid connection 1 toward the second fluid connection 2 to bypass the second flow restrictor 25b. And the second one-way valve 26b forces a fluid flow through the fourth fluid path 19' from the second fluid connection 2 toward the first fluid connection 1 to pass through the second flow restrictor 25b, thereby creating a pressure drop across the second flow restrictor 25b.

The hydraulic steering circuit 300 of FIG. 4 further differs from the hydraulic steering circuit 200 of FIG. 3 in that in the steering circuit 300 of FIG. 4 further comprises a shuttle valve 24b configured to select as a hydrostatic pressure acting on the second actuator 21b of the valve 8 a maximum hydrostatic pressure out of the hydrostatic pressures acting on the fluid ports 20a', 20b' of the valve 20'.

The second fluid path 7 including the two-way valve 8, the fourth fluid path 19' including the two-way valve 20', the flow restrictors 25a, 25b, the one-way valves 26a, 26b, and the shuttle valves 24a, 24b ensure that the hydraulic steering circuit 300 of FIG. 4 functions symmetrically with respect to the flow direction between the first fluid connection 1 and the second fluid connection 2, or between first fluid connection 1 and the third fluid connection 3.

Again, the valve 8 functions a compensator valve and guarantees a constant pressure drop across the valve 22, thereby ensuring that the fluid flow through the valve 22 and through the rear steering cylinder 6 only depends on the flow cross-section of the valve 22 set by the ECU 12 and is independent of a mechanical load coupled to the rear steering cylinder 6. The fluid connection between the actuators 21a, 21b of the valve 8 and the fluid ports 22a, 22a', 22b, 22b' of the valve 22 ensure that the valve 8 function symmetrically with respect to the flow direction between the first fluid connection 1 and the second fluid connection 2, or between the first fluid connection 1 and the third fluid connection 3.

The second proportional bypass control valve 20' is configured to modify the compensating behavior of the valve 8 in such a way that the fluid flow in the first fluid path 4 and through the rear steering cylinder 6 may be modified based on the total fluid flow between the first fluid connection 1 and the second or third fluid connection 2 or 3. As the valve 20' is fully closed, there is no fluid flow in the fourth fluid path 19' and no pressure drop across any of the flow restrictors 25a, 25b, so that the hydrostatic pressure acting on the shuttle valve 24b of the valve 8 is equal to the hydrostatic pressure at the first fluid connection 1 or at the second fluid connection 2, depending on the flow direction. On the other hand, opening or partially opening the second proportional bypass flow control valve 20' set by the ECU 12 generates a flow in the fourth fluid path 19' and a pressure drop across one of the first flow restrictor 25a and the second flow restrictor 25b, again depending on the flow direction, thereby lowering the hydrostatic pressure acting on the shuttle valve 24b of the valve 8 and decreasing the flow-cross section of the valve 8.

Thus, the larger the flow cross-section of the valve 20', the higher the rate (measured in volume per second) at which fluid bypasses the rear steering cylinder 6 via the valves 8 and 20', thereby reducing the displacement or the steering angle of the rear steering cylinder 6 with respect to the displacement or the steering angle of the front steering cylinder 11.

Figure 5:
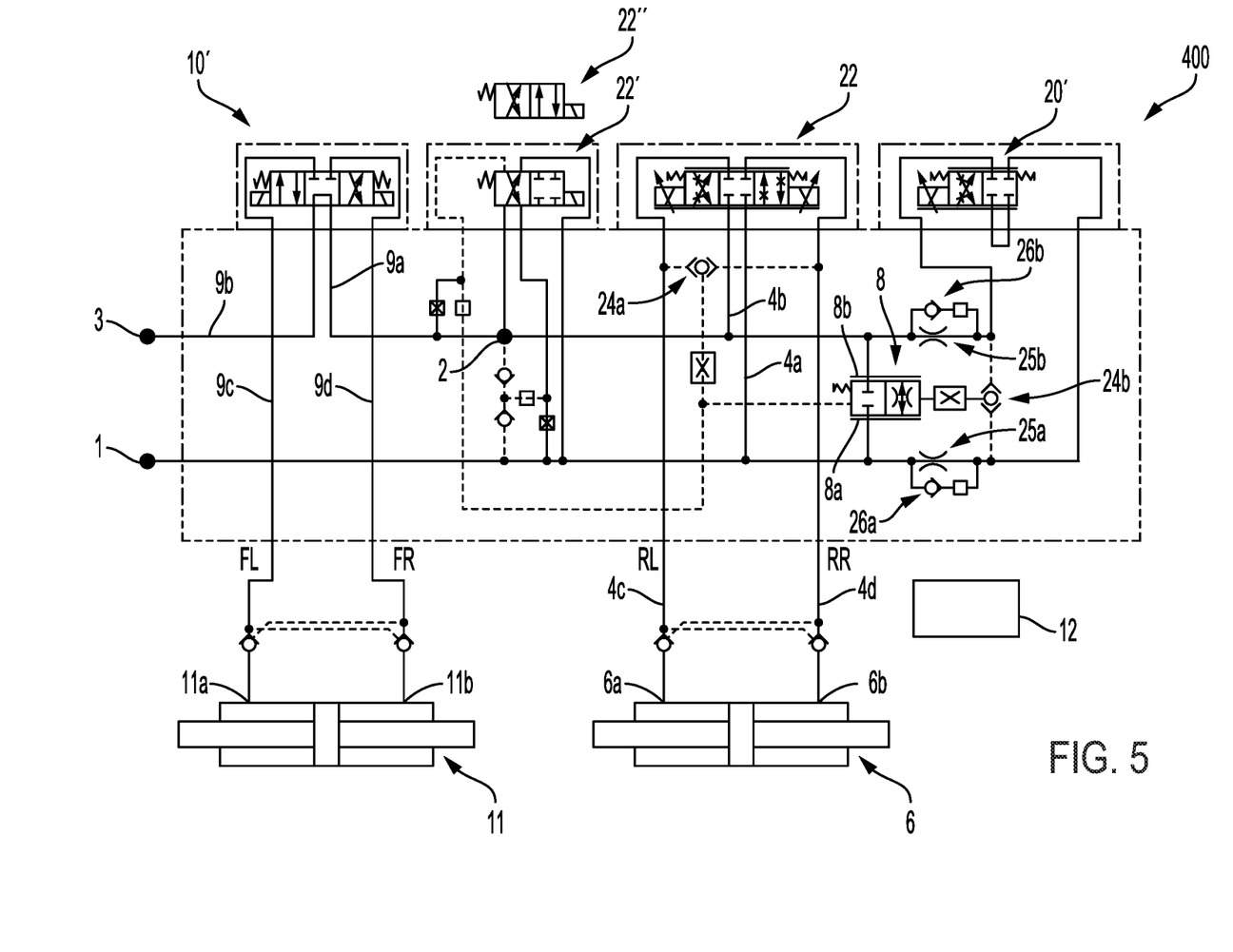
FIG. 5 shows a hydraulic steering circuit for a vehicle according to a fourth embodiment.

FIG. 5 shows a hydraulic steering circuit 400 for a vehicle according to a fourth embodiment which is a slight variant of the hydraulic steering circuit 300 of FIG. 4. Again, the hydraulic steering circuit 500 of FIG. 5 includes the steering power unit 50 shown in FIG. 2. A skilled artisan readily understands how the various components of the hydraulic steering circuit 400 of FIG. 5 can be associated with the corresponding components of the hydraulic steering circuit 300 of FIG. 4. It may merely be mentioned that in FIG. 5 a 4/3-way valve 10' replaces the 2/2-way valve 10 of FIG. 4, and that the open position or open positions of the 2/2-way vales 22', 22' of FIG. 5 replace the neutral center position of the 4/3-way valve 22 of FIG. 4.

The present disclosure may further relate to one or more of the following aspects:

1. Hydraulic circuit, in particular hydraulic steering circuit for steering at least one vehicle axle, the hydraulic circuit comprising:
   a first fluid connection;
   a second fluid connection;
   a first fluid path providing fluid communication or selective fluid communication between the first fluid connection and the second fluid connection; and
   a second fluid path providing fluid communication or selective fluid communication between the first fluid connection and the second fluid connection, in parallel to the first fluid path;
   wherein the first fluid path comprises a first hydraulic displacement unit; and
   wherein the second fluid path comprises at least a first proportional bypass control valve for controlling a bypass fluid flow in the second fluid path.

2. The hydraulic circuit according to aspect 1, wherein the first hydraulic displacement unit comprises a first hydraulic steering cylinder for steering a first vehicle axle, in particular a vehicle rear axle.

3. The hydraulic circuit according to any one of the preceding aspects, further comprising:
   a third fluid connection; and
   a third fluid path providing fluid communication or selective fluid communication between the second fluid connection and the third fluid connection;
   wherein the third fluid path comprises a second hydraulic displacement unit, so that the first hydraulic displacement unit and the second hydraulic displacement unit are fluidly connected or selectively fluidly connected in series between the first fluid connection and the third fluid connection.

4. The hydraulic circuit according to aspect 3, wherein the second hydraulic displacement unit comprises a second hydraulic steering cylinder for steering a second vehicle axle, in particular a vehicle front axle.

5. The hydraulic circuit according to any one of the preceding aspects, wherein the first fluid path comprises a proportional flow control valve, preferably an electronically actuatable proportional flow control valve, the proportional flow control valve comprising at least a first fluid port in fluid communication or in selective fluid communication with the first hydraulic displacement unit, and a second fluid port in fluid communication or in selective fluid communication with the second fluid connection.

6. The hydraulic circuit according to aspect 5, wherein the first proportional bypass control valve comprises:
   a first hydrostatically actuatable actuator configured to bias the first proportional bypass control valve toward a closed position, and
   a second hydrostatically actuatable actuator configured to bias the first proportional bypass control valve toward an open position;
   wherein the first hydrostatically actuatable actuator of the first proportional bypass control valve is in fluid communication or in selective fluid communication with the first fluid port of the proportional flow control valve; and,
   wherein the second hydrostatically actuatable actuator of the first proportional bypass control valve is in fluid communication or in selective fluid communication with the second fluid port of the proportional flow control valve.

7. The hydraulic circuit according to any one of the preceding aspects, further comprising a fourth fluid path providing fluid communication or selective fluid communication between the first fluid connection and the second fluid connection, in parallel to the first fluid path and to the second fluid path, the fourth fluid path comprising a second proportional bypass control valve for controlling a bypass fluid flow in the fourth fluid path.

8. The hydraulic circuit according to aspect 7,
wherein the first proportional bypass control valve is configured as a two-way valve allowing a flow of fluid through the second fluid path in both flow directions between the first fluid connection and the second fluid connection, and
wherein the second proportional bypass control valve is configured as a two-way valve allowing a flow of fluid through fourth fluid path in both flow directions between the first fluid connection and the second fluid connection.

9. The hydraulic circuit according to any one of aspects 7 and 8, further comprising a first shuttle valve configured to select as a hydrostatic pressure acting on the second hydrostatically actuatable actuator of the first proportional bypass control valve a maximum hydrostatic pressure acting on the second proportional bypass control valve.

10. The hydraulic circuit according to aspect 9, the fourth flow path further comprising:
a first flow restrictor; and
a second flow restrictor;
wherein a first fluid port of the second proportional bypass control valve and a first fluid port of the first shuttle valve are in fluid communication or in selective fluid communication with first fluid connection via the first flow restrictor; and
wherein a second fluid port of the second proportional bypass control valve and a second fluid port of the first shuttle valve are in fluid communication with the second fluid connection via the second flow restrictor.

11. The hydraulic circuit according to aspect 10, the fourth fluid path further comprising:
a first one-way vale, and
a second one-way valve;
wherein the first one-way valve is configured to allow a flow of fluid from the first fluid port of the second proportional bypass control valve toward the first fluid connection to bypass the first flow restrictor; and
wherein the second one-way valve is configured to allow a flow of fluid from the second fluid port of the second proportional bypass control valve toward the second fluid connection to bypass the second flow restrictor.

12. The hydraulic circuit according to any one of aspects 6 to 11, further comprising a second shuttle valve configured to select as a hydrostatic pressure acting on the first hydrostatically actuatable actuator of the first proportional bypass control valve a maximum hydrostatic pressure acting on the first hydraulic displacement unit.

13. The hydraulic circuit according to aspect 7, wherein the second proportional bypass control valve comprises:
a first hydrostatically actuatable actuator configured to bias the second proportional bypass control valve toward a closed position, and
a second hydrostatically actuatable actuator configured to bias the second proportional bypass control valve toward an open position;
wherein the first hydrostatically actuatable actuator of the second proportional bypass control valve is in fluid communication or in selective fluid communication with the second fluid port of the proportional flow control valve; and,
wherein the second hydrostatically actuatable actuator of the second proportional bypass control valve is in fluid communication or in selective fluid communication with the first fluid port of the proportional flow control valve.

14. The hydraulic circuit according to any one of the preceding aspects, further comprising:
a fluid pump;
a fluid tank in fluid communication with the fluid pump; and
at least one flow direction control valve;
wherein the flow direction control valve is configured to selectively one of:
(ii) fluidly connect the fluid pump with the first fluid connection, and fluidly connect the fluid tank with of the second fluid connection and the third fluid connection; and
(iii) fluidly connect the fluid pump with one of the second fluid connection and the third fluid connection, and fluidly connect the fluid tank with the first fluid connection.

15. A driveline for a vehicle, comprising:
a first steering axle, in particular a vehicle rear axle;
a second steering axle, in particular a vehicle front axle; and
the hydraulic circuit according to any one of aspects 2 and 4 or of any one of aspects 5 to 14 in as far a they refer to aspects 2 and 4;
wherein the first steering cylinder is configured to actuate the first steering axle for steering the first steering axle; and
wherein the second steering cylinder is configured to actuate the second steering axle for steering the second steering axle.

The invention claimed is:

1. A hydraulic circuit for steering at least one vehicle axle, the hydraulic circuit comprising:
a first fluid path having a first end and a second end and providing fluid communication or selective fluid communication between the first end and the second end of the first fluid path;
a second fluid path providing fluid communication or selective fluid communication between the first end of the first fluid path and the second end of the first fluid path, in parallel to the first fluid path, wherein the second fluid path is in communication with the first fluid path via a first end of the second fluid path and a second end of the second fluid path; and
a third fluid path having a first end fluidly connected with the second end of the first fluid path and having a second end, and providing fluid communication or selective fluid communication between the second end of the first fluid path and the second end of the third fluid path;
wherein the first fluid path comprises a first hydraulic displacement unit;
wherein the second fluid path comprises at least a first proportional bypass control valve for controlling a bypass fluid flow in the second fluid path;
wherein the third fluid path comprises a second hydraulic displacement unit, so that the first hydraulic displacement unit and the second hydraulic displacement unit are fluidly connected or selectively fluidly connected in series between the first end of the first fluid path and the second end of the third fluid path; and wherein the first end of the first fluid path and the second end of the third fluid path forms an interface between the hydraulic circuit and a power steering unit.

2. The hydraulic circuit according to claim 1, wherein the first hydraulic displacement unit comprises a first hydraulic steering cylinder for steering a first vehicle axle.

3. The hydraulic circuit according to claim 1, wherein the second hydraulic displacement unit comprises a second hydraulic steering cylinder for steering a second vehicle axle.

4. The hydraulic circuit according to claim 1, wherein the first fluid path comprises a proportional flow control valve, the proportional flow control valve comprising at least a first fluid port in fluid communication or in selective fluid communication with the first hydraulic displacement unit, and a second fluid port in fluid communication or in selective fluid communication with the second end of the first fluid path.

5. The hydraulic circuit according to claim 4, wherein the first proportional bypass control valve comprises:
  a first hydrostatically actuatable actuator configured to bias the first proportional bypass control valve toward a closed position, and
  a second hydrostatically actuatable actuator configured to bias the first proportional bypass control valve toward an open position;
  wherein the first hydrostatically actuatable actuator of the first proportional bypass control valve is in fluid communication or in selective fluid communication with the first fluid port of the proportional flow control valve; and
  wherein the second hydrostatically actuatable actuator of the first proportional bypass control valve is in fluid communication or in selective fluid communication with the second fluid port of the proportional flow control valve.

6. The hydraulic circuit according to claim 5, further comprising a second shuttle valve configured to select as a hydrostatic pressure acting on the first hydrostatically actuatable actuator of the first proportional bypass control valve a maximum hydrostatic pressure acting on the first hydraulic displacement unit.

7. The hydraulic circuit according to claim 1, further comprising a fourth fluid path providing fluid communication or selective fluid communication between the first end of the first fluid path and the second end of the first fluid path, in parallel to the first fluid path and in parallel to the second fluid path, the fourth fluid path comprising a second proportional bypass control valve for controlling a bypass fluid flow in the fourth fluid path.

8. The hydraulic circuit according to claim 7,
  wherein the first proportional bypass control valve is configured as a two-way valve allowing a flow of fluid through the second fluid path in both flow directions between the first end of the first fluid path and the second end of the first fluid path, and
  wherein the second proportional bypass control valve is configured as a two-way valve allowing a flow of fluid through fourth fluid path in both flow directions between the first end of the first fluid path and the second end of the first fluid path.

9. The hydraulic circuit according to claim 7, further comprising a first shuttle valve configured to select as a hydrostatic pressure acting on a second hydrostatically actuatable actuator of the first proportional bypass control valve a maximum hydrostatic pressure acting on the second proportional bypass control valve.

10. The hydraulic circuit according to claim 9, the fourth flow path further comprising:
  a first flow restrictor; and
  a second flow restrictor;
  wherein a first fluid port of the second proportional bypass control valve and a first fluid port of the first shuttle valve are in fluid communication or in selective fluid communication with the first end of the first fluid path via the first flow restrictor; and
  wherein a second fluid port of the second proportional bypass control valve and a second fluid port of the first shuttle valve are in fluid communication with the second end of the first fluid path via the second flow restrictor.

11. The hydraulic circuit according to claim 10, the fourth fluid path further comprising:
  a first one-way valve, and
  a second one-way valve;
  wherein the first one-way valve is configured to allow a flow of fluid from the first fluid port of the second proportional bypass control valve toward the first end of the first fluid path to bypass the first flow restrictor; and
  wherein the second one-way valve is configured to allow a flow of fluid from the second fluid port of the second proportional bypass control valve toward the second end of the first fluid path to bypass the second flow restrictor.

12. The hydraulic circuit according to claim 7, wherein the second proportional bypass control valve comprises:
  a first hydrostatically actuatable actuator configured to bias the second proportional bypass control valve toward a closed position; and
  a second hydrostatically actuatable actuator configured to bias the second proportional bypass control valve toward an open position;
  wherein the first hydrostatically actuatable actuator of the second proportional bypass control valve is in fluid communication or in selective fluid communication with a second fluid port of a proportional flow control valve; and
  wherein the second hydrostatically actuatable actuator of the second proportional bypass control valve is in fluid communication or in selective fluid communication with a first fluid port of the proportional flow control valve.

13. The hydraulic circuit according to claim 1, further comprising:
  a fluid pump;
  a fluid tank in fluid communication with the fluid pump; and
  at least one flow direction control valve;
  wherein the flow direction control valve is configured to selectively one of:
    (i) fluidly connect the fluid pump with the first end of the first fluid path, and fluidly connect the fluid tank with one of the second end of the first fluid path and the second end of the third fluid path; and
    (ii) fluidly connect the fluid pump with one of the second end of the first fluid path and the second end of the third fluid path, and fluidly connect the fluid tank with the first end of the first fluid path.

14. A driveline for a vehicle, comprising:
a first steering axle;
a second steering axle; and
a hydraulic circuit, wherein the hydraulic circuit comprises:
  a first fluid path having a first end and a second end and providing fluid communication or selective fluid communication between the first end and the second end of the first fluid path;
  a second fluid path providing fluid communication or selective fluid communication between the first end of the first fluid path and the second end of the first fluid path, in parallel to the first fluid path, wherein the second fluid path is in communication with the first fluid path via a first end of the second fluid path and a second end of the second fluid path, and wherein the first fluid path comprises a first hydraulic displacement unit comprising a first hydraulic steering cylinder for steering a first vehicle axle; and
  a third fluid path having a first end coinciding with the second end of the first fluid path and a second end of the second fluid path, and having a second end, and providing fluid communication or selective fluid communication between the second end of the first fluid path and the second end of the third fluid path;
  wherein the second fluid path comprises at least a first proportional bypass control valve for controlling a bypass fluid flow in the second fluid path;
  wherein the third fluid path comprises a second hydraulic displacement unit, so that the first hydraulic displacement unit and the second hydraulic displacement unit are fluidly connected or selectively fluidly connected in series between the first end of the first fluid path and the second end of the third fluid path;
  wherein the first hydraulic steering cylinder is configured to actuate the first steering axle for steering the first steering axle;
  wherein the second hydraulic displacement unit comprises a second hydraulic steering cylinder for steering a second vehicle axle; and
  wherein the second hydraulic steering cylinder is configured to actuate the second steering axle for steering the second steering axle.

15. The driveline of claim 14, wherein the first steering axle is a vehicle rear axle.

16. The driveline of claim 14, wherein the second steering axle is a vehicle front axle.

17. The driveline of claim 14, wherein there is a further valve between a first end of the second fluid path and the second end of the first fluid path.

* * * * *